United States Patent [19]
Meronek

[11] Patent Number: 6,050,544
[45] Date of Patent: Apr. 18, 2000

[54] VALVE COUPLING DEVICE FORMING METAL-TO-METAL SEAL

[75] Inventor: Richard A. Meronek, Houston, Tex.

[73] Assignee: Kvaerner Oilfield Products, Houston, Tex.

[21] Appl. No.: 08/927,455

[22] Filed: Sep. 11, 1997

[51] Int. Cl.$^7$ .................................................. F16L 37/28
[52] U.S. Cl. ..................... 251/149.6; 285/332.1
[58] Field of Search .............................. 251/149.1, 149.6; 285/917, 332.1; 137/614.04

[56] References Cited

U.S. PATENT DOCUMENTS

| | | | |
|---|---|---|---|
| 3,477,105 | 11/1969 | Cranage | 251/149.1 |
| 3,739,846 | 6/1973 | Beson . | |
| 3,965,977 | 6/1976 | Beson . | |
| 4,703,774 | 11/1987 | Seehausen . | |
| 4,709,725 | 12/1987 | Morrison . | |
| 4,796,922 | 1/1989 | Prichard . | |
| 4,852,611 | 8/1989 | Knerr et al. . | |
| 4,884,584 | 12/1989 | Smith | 137/614.04 |
| 5,370,153 | 12/1994 | Galle | 137/614.04 |

FOREIGN PATENT DOCUMENTS

| | | |
|---|---|---|
| 2097885 | 11/1982 | United Kingdom . |
| 2132728 | 7/1984 | United Kingdom . |
| 2184508 | 6/1987 | United Kingdom . |
| 2195158 | 3/1988 | United Kingdom . |

Primary Examiner—Kevin Lee
Attorney, Agent, or Firm—Wendy Buskof; Bayko Gibson et al.

[57] ABSTRACT

A coupling element is disclosed that is capable of axial and lateral movement for use in connecting fluid lines such as control lines used in subsea drilling. The coupling element has a male sealing element with a first end, a second end, and a longitudinal axis extending between the first end and the second end. The male sealing element defines a generally frusto-conical sealing surface. A fluid passageway for the transmission of fluids is defined through the male sealing element along the longitudinal axis. The generally frusto-conical sealing surface forms a metal-to-metal seal when mated with a female sealing element. A female sealing element with a sealing surface that is complementary to the generally frustoconical sealing surface of the male coupling element is also disclosed. The female sealing element forms a pressure energized metal-to-metal seal with the male sealing element when the two are mated. A poppet valve element may be positioned within the fluid passageway of the female sealing element.

25 Claims, 7 Drawing Sheets

VALVE COUPLING DEVICE FORMING METAL-TO-METAL SEAL

BACKGROUND

The present invention relates to a coupling device for fluid lines.

Subsea drilling and production operations include the use of connectors and mandrels that house couplers for the actuation of fluid lines such as control lines. These connectors and mandrels must withstand harsh environmental conditions as well as be adaptable to disconnect quickly in bad weather. The fluid lines extend several hundred to thousands of feet below the surface of the ocean and can be housed in a riser. When the platform must disconnect in an emergency, all the valves and control lines in the riser must be disconnected or severed. These lines are typically controlled by hydraulic couplers that are well known in the art. These couplers are usually severed if the riser bends to a critical angle before the operator can remotely disconnect the riser. If this happens, the couplers are usually damaged beyond the point of being usable. In these emergency quick disconnect situations, it would be desirable to have a connector that could withstand a certain degree of lateral bending without suffering any irreparable damage.

Another issue encountered by subsea drilling and production is the machining of the connector and the mandrel that carry the couplers for the fluid lines. Each item must be precision machined in order to ensure a proper fit for the coupler. This means that if one hole is machined incorrectly, the remaining holes cannot be used and the piece will need to be re-machined. Having an adaptor or housing for the coupler that can be machined to compensate for mismachining of the mandrel or connector would be highly useful. This type of adapter would also be useful for interchanging hydraulic couplers with different mandrels and connectors.

OBJECTS OF THE INVENTION

It is an object of the present invention to provide a coupling element that can withstand a certain degree of lateral bending without suffering any irreparable damage.

It is another object of the present invention to provide a coupling element that is removable from the mandrel it is mounted in.

It is another object of the present invention to provide a coupling element that can move laterally as well as axially within a housing.

SUMMARY

One embodiment of the present invention provides for a coupling element that is capable of not only axial but lateral movement for use in connecting fluid lines such as control lines used in subsea drilling and production. The coupling element has a male sealing element with a first end, a second end, and a longitudinal axis extending between the first end and the second end. The male sealing element has a generally cylindrical shape and the first end defines a generally frusto-conical sealing surface. A fluid passageway for the transmission of fluids is defined through the male sealing element along the longitudinal axis. The generally frusto-conical sealing surface forms a metal-to-metal seal when mated with a female sealing element.

A female sealing element is also provided. The female sealing element has a sealing surface that is complementary to the generally frustoconical sealing surface of the male coupling element. The female sealing element forms a pressure energized metal-to-metal seal with the male sealing element when the two are mated.

A female sealing element with a poppet valve element positioned within the fluid passageway of the female sealing element is also disclosed. The poppet valve prevents contaminants from entering the line when the sealing elements are in a disconnected state.

DETAILED DESCRIPTION OF THE PREFERRED EMBODIMENTS

One embodiment of the present invention provides for a coupling element 10 that is capable of not only axial but lateral movement. (See FIG. 1) The coupling element 10 has a male sealing element 12 with a first end 14, a second end 16, and a longitudinal axis 20 extending between the first end 14 and the second end 16. The male sealing element 12 has a generally cylindrical shape and the first end 14 defines a generally frusto-conical sealing surface 22. A fluid passageway 36 for the transmission of fluids is defined through the male sealing element 12 along the longitudinal axis 20. The generally frusto-conical sealing surface 22 forms a metal-to-metal seal when mated with a female sealing element.

Preferably, the male sealing element 12 comprises a first section 42 and a second section 44. The first section 42 is coaxially aligned with the second section 44 and has a first end 46, a second end 48, and an outer surface 18 defining an outer diameter. The second section 44 has a first end 50, a second end 52, and an outer surface 53 that defines an outer diameter. The first end 46 of the first section 42 includes the generally frusto-conical sealing surface 22 and the second end 48 of the first section 42 is in sealing contact with the first end 50 of the second section 44. The outer diameter of the first section 42 is smaller than the outer diameter of the second section 44. (See FIG. 1).

Figure 1:
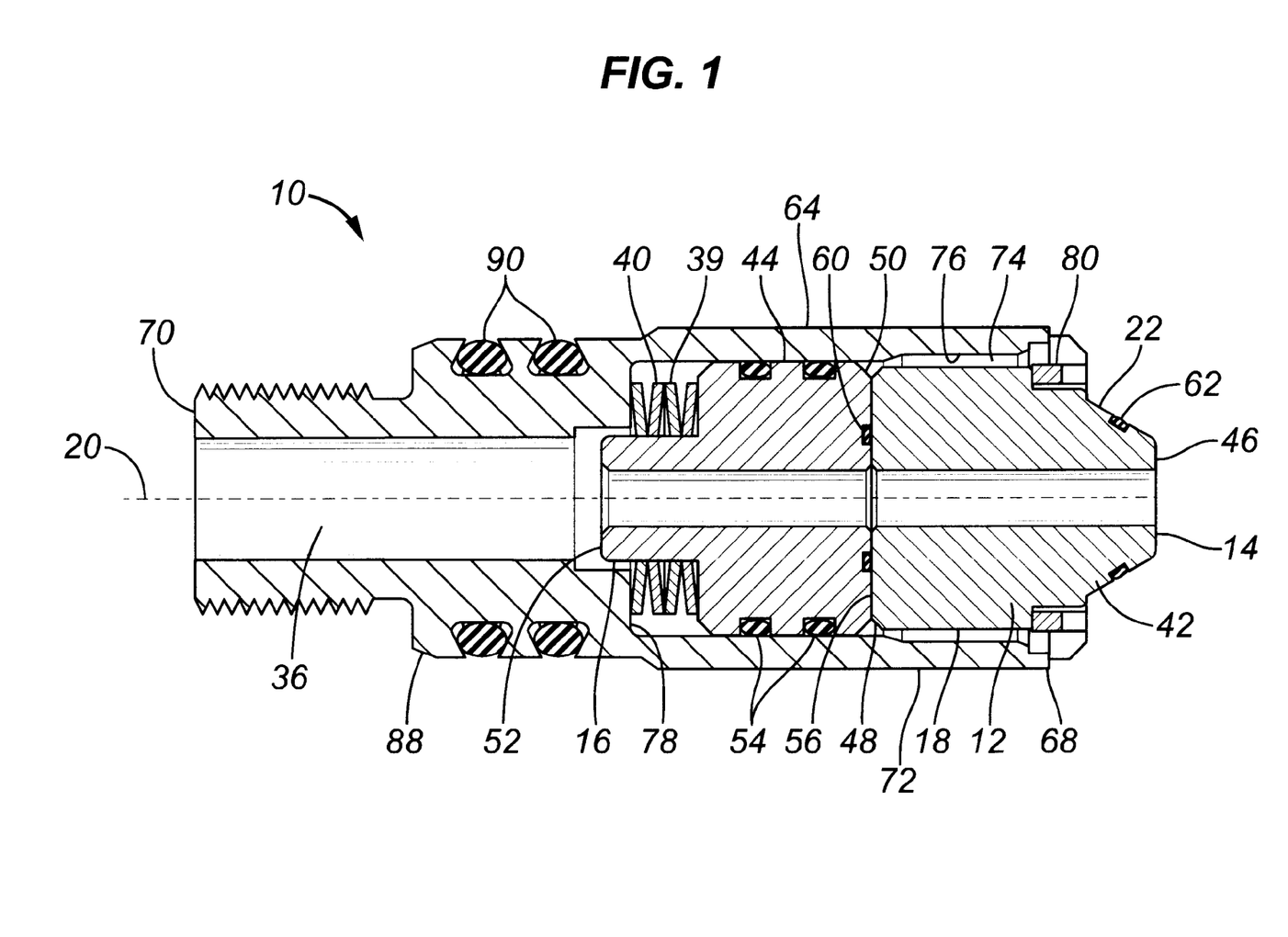
FIG. 1 is a cross-sectional view of the coupling element showing the male sealing element.

The coupling element 10, preferably has a housing 64 for receiving the male sealing element 12. The first end 14 of the male sealing element 12 extends from the housing 64. There is a means 40 for biasing the male sealing element 12 positioned between the second end 16 of the male sealing element 12 and the housing 64. The male sealing element 12 is biased along the longitudinal axis 20 from a first position to a second position so that the male sealing element 12 is capable of axial movement with respect to the longitudinal axis 20 to compensate for axial misalignment of the male sealing element 12. A portion of the male sealing element 12 is capable of lateral movement with respect to the longitudinal axis 20 to compensate for lateral misalignment of the male sealing element 12.

The housing 64 preferably has a longitudinal axis that is coaxially aligned with the longitudinal axis 20 of the male sealing element 12, a first end 68 and a second end 70.(See FIG. 4) The housing 64 can be formed from a sidewall 72 defining a bore 74 positioned along the longitudinal axis 20 and extending therethrough. The bore 74 defines an inside surface 76 that has an inside diameter. The outer diameter of the first section 42 of the male sealing element 12 is smaller than the inside diameter of the housing 64, so that the first section 42 can move laterally within the housing 64. The outer surface 53 of the second section 44 is closely received by the inside surface 76 of the housing 64 and is not capable of lateral movement within the housing 64.

The first end 50 of the second section 44 defines a substantially flat face 56 and the substantially flat face defines an annularly extending groove 58 for receiving a face seal 60. (See FIG. 4) The coupling element 10 further comprises a face seal 60 received in the annularly extending groove 58. The face seal 60 is designed to contact and sealably engage the second end 48 of the first section 42. The outer surface 53 of the second section 44 defines a pair of radially extending grooves 66 positioned between the first end 50 and the second end 52 of the second section 44. The coupler 10 preferably further comprises a pair of elastomeric sealing elements 54 received in the pair of radially extending grooves 66 that sealingly contact the inside surface of the bore 74 formed by the housing 64.

Figure 4:
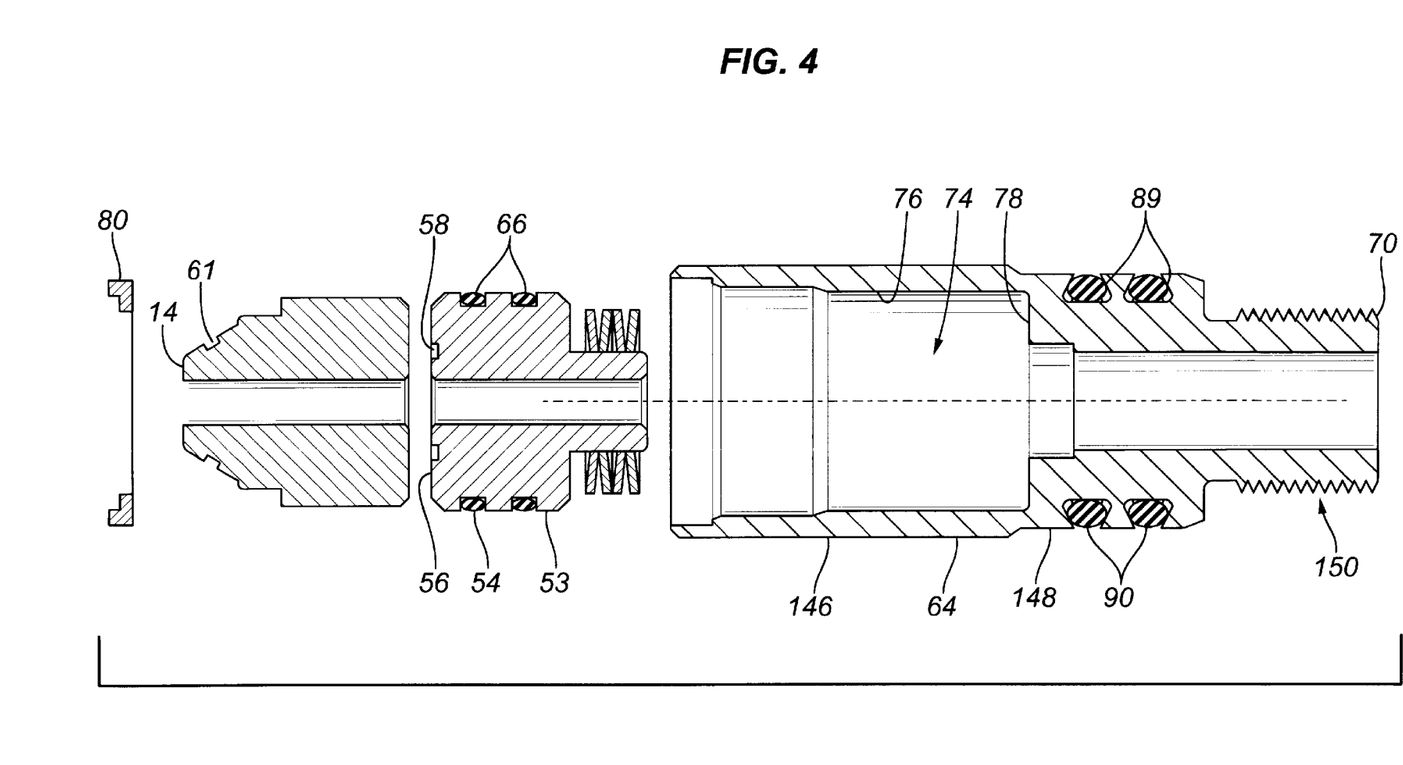
FIG. 4 is a cross-sectional exploded view of the coupling element for the male sealing element.

Preferably, the inside surface 76 of the bore 74 defines an annular wall portion 78 facing the first end 14 of the male sealing element 12. The biasing means 40 is positioned between the second end 16 of the male sealing element 12 and the annular wall portion 78. The second end 52 of the second section 44 is biased toward the first section 42 by the biasing means 40. The biasing means 40 can be a flat compression spring means 39, such as a Bellville spring. This type of spring is used to accommodate for axial misalignment of the male coupling element 12 when the coupler is being made up.

In order to provide a back up seal, for the male sealing element 12, it is preferred that the generally frusto-conical sealing surface 22 defines a radially extending groove 61 and the male sealing element 12 includes a radially extending elastomeric seal means 62 received in the radially extending groove 61.

Figure 7:
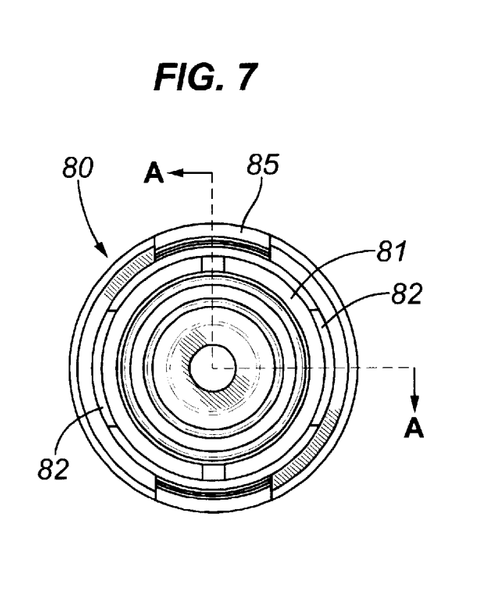
FIG. 7 is a cross-sectional view of one of the coupling elements.
Figure 8:
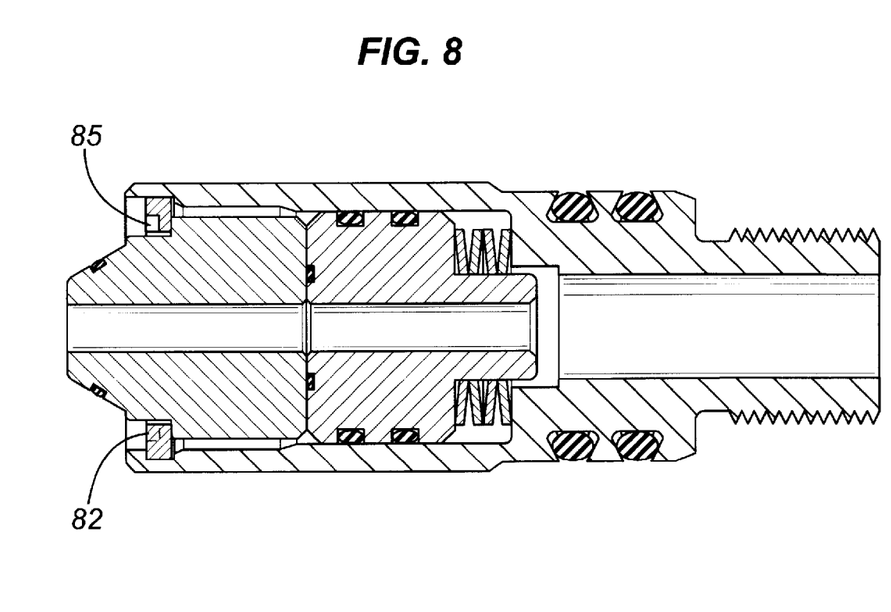
FIG. 8 is a sectional view taken along lines A—A in FIG. 7.

The male sealing element 12 is preferably held inside the housing 64 with a retainer means 80 mounted in the housing near the first end 68 between the inside surface 76 of the bore 74 of the housing 64 and the outside surface 18 of the male sealing element 12. The retainer means 80 is designed to releasably engage the male sealing element 12 inside the housing 64. This type of retainer can be a ring 81 with a key 82 that is sized to be received by a slot 85 and groove (not shown) defined by the inside surface 76 in the housing 64. (See FIGS. 7 & 8) The key 82 slides in the slot 85 and then the ring 81 is turned so that the key 82 is received in the groove and the ring is locked in place. This type of retainer ring allows the male sealing element to be removed from the housing 64 and easily replaced if the sealing element becomes damaged.

In order to seal the housing 64 in a body such as a connector 140, it is preferred that housing 64 has an outer surface 88 defining a pair of radially extending grooves 89 near the second end 70. The housing 64 further comprises a pair of elastomeric sealing means 90 received in the pair of radially extending grooves 89. O-rings are typically used for this purpose.

In another embodiment of the present invention, there is provided a coupling element 21 having a female sealing element 24. (See FIG. 2) The female sealing element 24 has a first end 26, a second end 28, and a longitudinal axis 30 extending between the first end 24 and the second end 28. The first end 26 defines a sealing surface 32 that forms a metal-to-metal seal when mated with a male sealing element such as the one described above. The female sealing element 24, like the male sealing element 12 described above, has a generally cylindrical shape. The female sealing element 24 also defines a fluid passageway 35 extending therethrough for the transmission of fluids.

Figure 2:
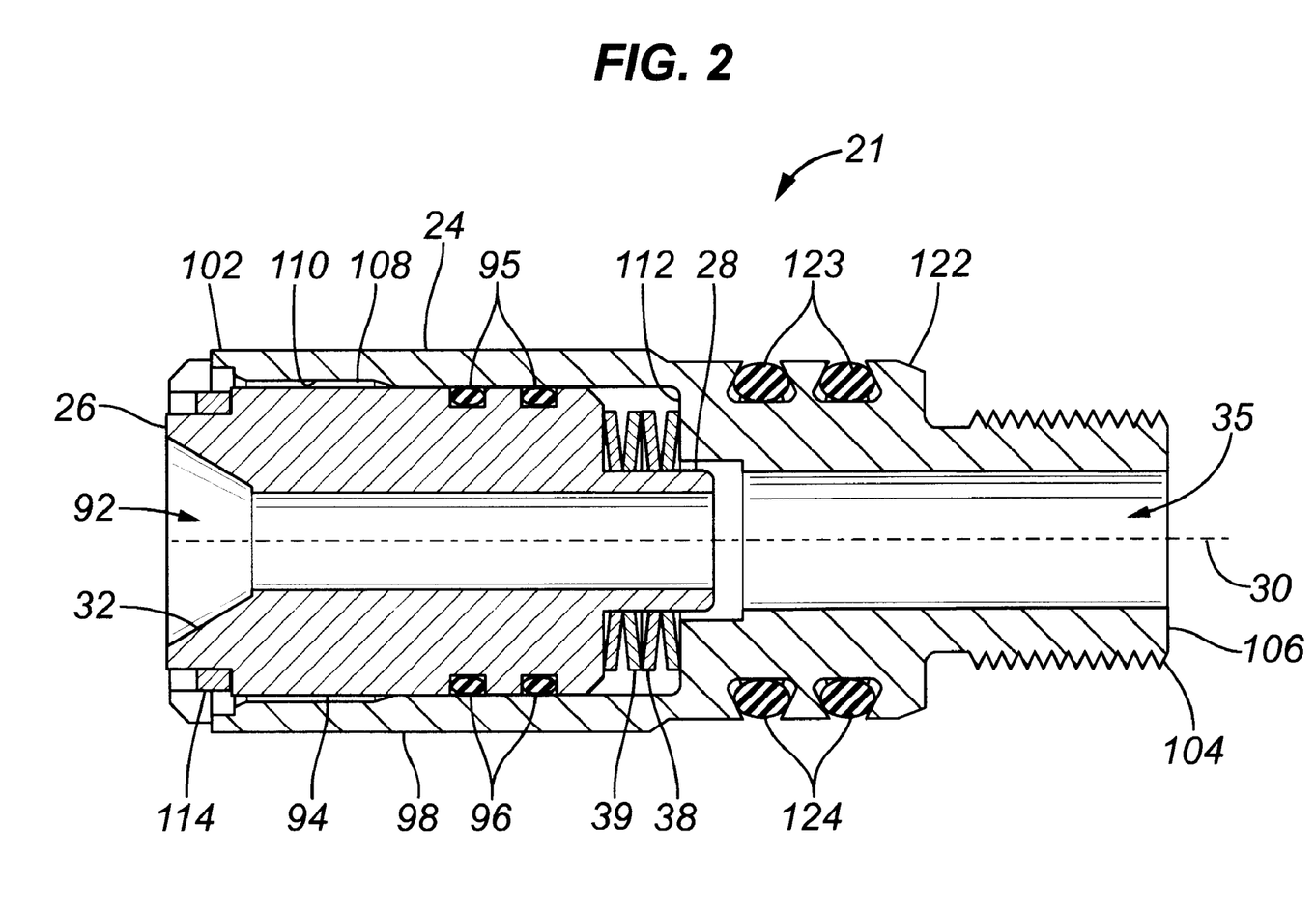
FIG. 2 is a cross-sectional view of the coupling element showing the female sealing element.

Preferably, there is a housing 98 for receiving the female sealing element 24. The first end 26 of the female sealing element 24 extends from the housing 98. A means 38 for biasing the female sealing element 24 from a first position to a second position is also provided. The means 38 for biasing being positioned between the female sealing element 24 and the housing 98 adjacent to the second end 28 of the female sealing element 24. The female sealing element 24 is capable of axial movement with respect to the longitudinal axis 30 to accommodate for axial misalignment of the female sealing element 24.

The housing 98 for the female sealing element 24 is similar to the housing 64 described above for the male sealing element 12. The housing 98 has a longitudinal axis 30 that is coaxially aligned with the longitudinal axis 30 of the female sealing element 24, a first end 102 and a second end 104. The housing 98 is formed from a sidewall 106 defining a bore 108 positioned along the longitudinal axis 30 and extending therethrough. The bore 108 defines an inside surface 110 that has an inside diameter. The inside surface 110 of the bore 108 defines an annular wall portion 112 facing the first end 26 of the female sealing element 24. The biasing means 38 is positioned between the second end 28 of the female sealing element 24 and the annular wall portion 112. The biasing means 38 can be a flat compression spring means 39, such as a Bellville spring.

The coupling element 21 can also have a retainer means as described above. The retainer means is mounted on the outer surface 94 of the female sealing element 24 near the first end 26, for releasably engaging the female sealing element 24 inside the housing 98. In order to seal the housing 98 in the mandrel 142, the housing 98 preferably has an outer surface 122 defining a pair of grooves 123. The coupling element 21 has a pair of elastomeric sealing means 124 received in the pair of grooves 123.

Preferably, the first end 26 of the female sealing element 24 defines a generally frusto-conical surface 32 which defines an axially extending tapered recess therein. The recess converges toward the second end 28 of the female sealing element 24. The female sealing element 24 further has an outer surface 94 defining a pair of radially extending grooves 95. There is also provided two radially extending elastomeric sealing elements 96 received in the pair of radially extending grooves 95.

In a preferred embodiment, there is provided a valve seat 126 positioned in the fluid passageway 36 of the female sealing element 24. (See FIG. 3) The valve seat 126 is positioned adjacent to the sealing surface 32 and facing away from the sealing surface 32. A valve element 128 is positioned in a generally longitudinally extending portion of the fluid passageway 36 adjacent to the sealing surface 32. The valve element 128 has a valve face 130 to sealingly contact the valve seat. There is also provided a means 132 for biasing the valve element 128 toward the valve seat 126.

Figure 3:
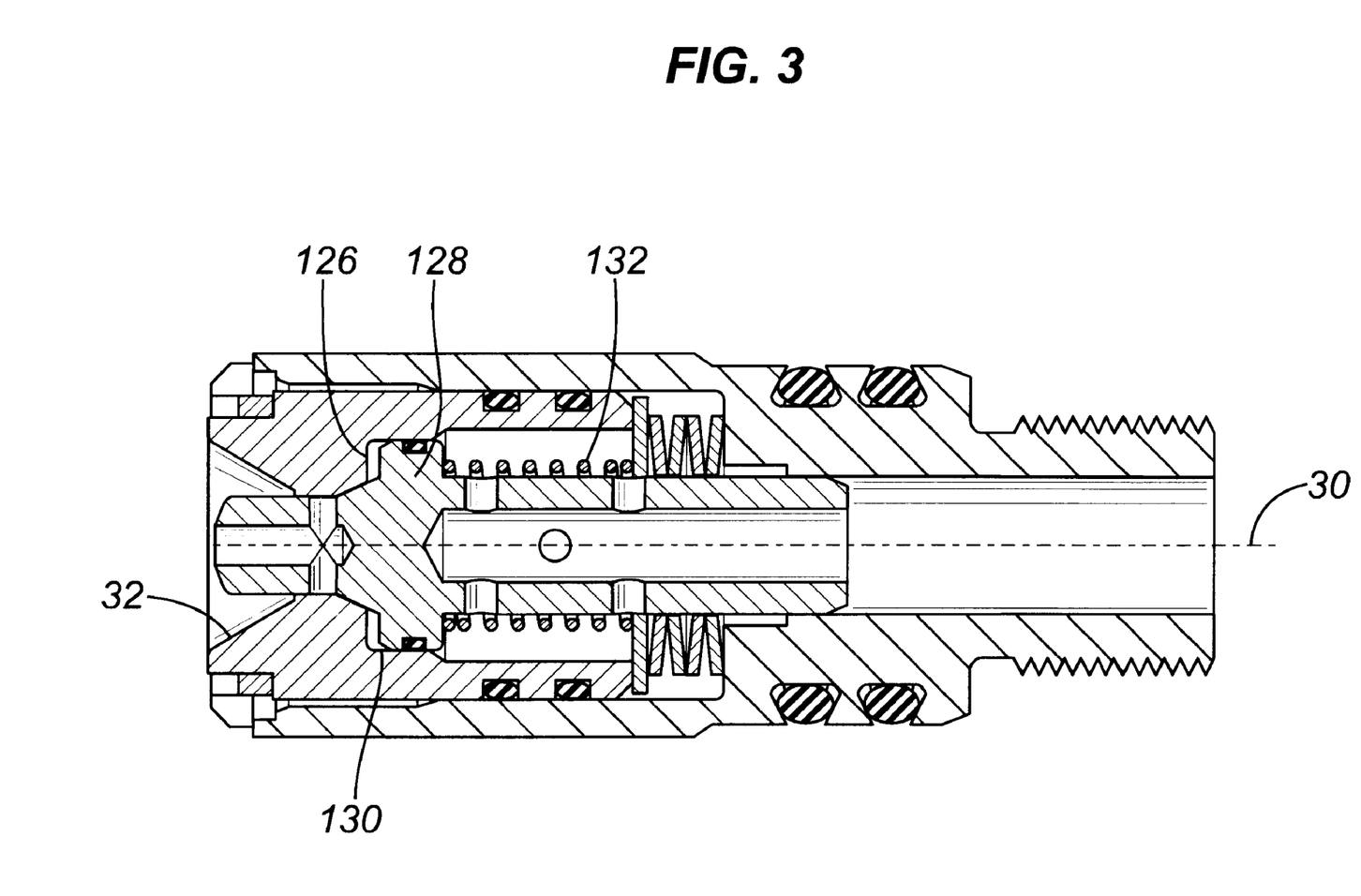
FIG. 3 is a cross-sectional view of the female sealing element with the valve element in place.

The valve element 128 is in sealing contact with the valve seat 126 when the female sealing element 24 is in a first or un-engaged as shown in FIG. 3. Thus when a male sealing element such as the one described herein is mated with the female sealing element the valve element 128 is biased toward the second end of the female sealing element out of contact with the valve seat and fluids are allowed to pass freely through the coupler. When the coupler is disengaged, the valve element 128 seals with the valve seat 126 and no fluids are allowed to enter or exit the line. This arrangement is useful for fluid lines that the operator does not want sea water to enter into when the coupler is disengaged from the riser. With this construction, once the coupler is disengaged, the valve element 128 is biased toward the first end 26 by the biasing means 38 of the female sealing element 24 to seal the fluid passageway 36.

In yet another embodiment of the present invention, there is provided a coupler assembly 136 using the male 12 and female 24 sealing elements described above. (See FIG. 5) The coupler assembly 136 comprises a male sealing element 12, a female sealing element 24 that are complementary to one another so that a metal-to-metal seal is formed when the two sealing elements are mated. The male sealing element 12 has a first end 14, a second end 16, and a longitudinal axis 20 extending between the first end 14 and the second end 16 and a generally cylindrical shape. The first end 14 defines a generally frusto-conical sealing surface 22 and a portion of the male sealing element 12 is capable of lateral movement with respect to the longitudinal axis 20 to compensate for lateral misalignment of the male sealing element 12. The male sealing element 12 and the female sealing element 24 define a fluid passageway 36 therethrough for the transmission of fluids. The generally frusto-conical sealing surface 22 forms a metal-to-metal seal when mated with the female sealing element 24.

Figure 5:
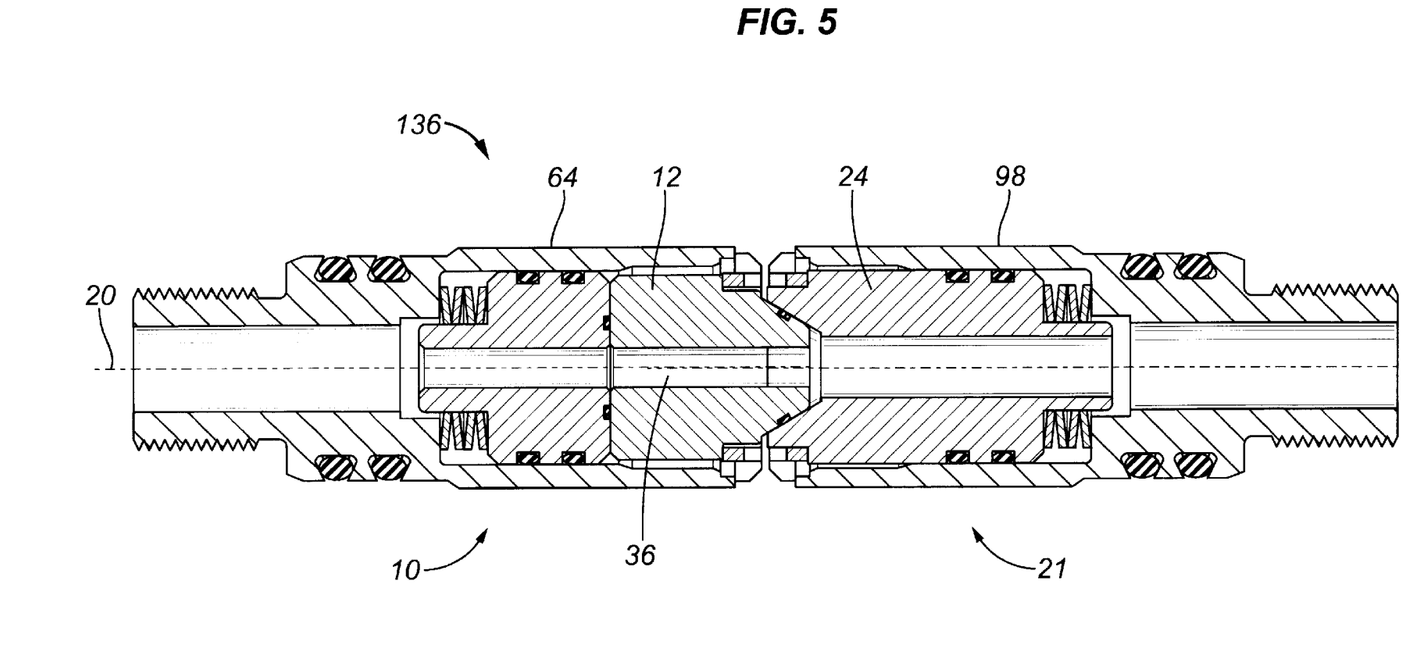
FIG. 5 is a cross-sectional view of the male and female coupling element made up.
Figure 6:
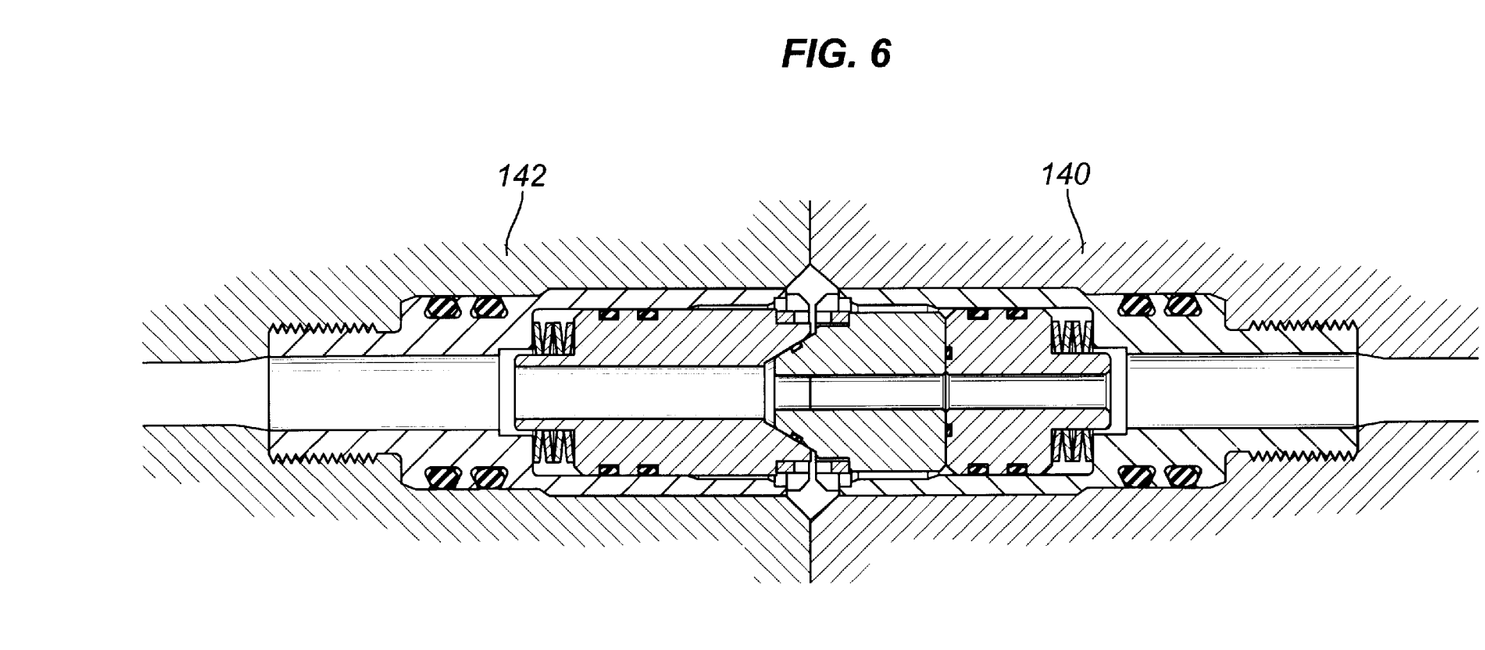
FIG. 6 is a partial cut away view of the coupler assembly.

There is also provided a first housing 64 for receiving the male sealing element 12, like that described above and second housing 98, like that described above, for receiving the female sealing element 24.

The female sealing element 24 has a first end 26, a second end 28, and a longitudinal axis 30 extending between the first end 26 and the second end. The first end 26 defines a sealing surface 32 where the sealing surface 32 forms a metal-to-metal seal when mated with the male sealing element 12. The female sealing element 24 has a generally cylindrical shape. The female sealing element 24 is capable of axial movement with respect to the longitudinal axis 20 from a first position shown in FIG. 2 to a second position shown in FIG. 5 to accommodate for axial misalignment of the female sealing element 24. The female sealing element 24 defines a fluid passageway 36 therethrough for the transmission of fluids that is coaxially aligned with the fluid passageway 36 defined by the male sealing element 12.

The coupler assembly 136 preferably has a means 40 for biasing the male sealing element 12 along the longitudinal axis 30 from a first position, shown in FIG. 1 to a second position shown in FIG. 5. The means 40 for biasing the male sealing element 12 is positioned between the second end 16 of the male sealing element 12 and the first housing 64, so that the male sealing element 12 is capable of axial movement with respect to the longitudinal axis 30 to compensate for axial misalignment of the male sealing element 12. Likewise, there is a means 38 for biasing the female sealing element 24 toward the male sealing element 12. The means 38 for biasing the female sealing element 24 is positioned between the second end 28 of the female sealing element 24 and the second housing 98.

When the male and female sealing elements are made up, the coupling assembly provides a fluid passageway that is sealed from the outside environment by the metal-to-metal seal formed between the sealing surfaces. In an emergency or high angle disconnect situation, the male sealing element can be removed at a high angle without damaging the coupler because the first portion of the male sealing element can float or move laterally within the housing, thus compensating for the high angle imposed by a particular situation without damaging the male sealing element.

In use, the coupling element 10 comprising the male sealing element 12 is positioned in the connector 140 with the first end facing the mandrel 142. The coupling element comprising the female sealing element 24 is positioned in the mandrel 142 with the first end 26 facing the connector 140. The connector is mated with the mandrel and the respective sealing surfaces 22, 32 of the female and male sealing elements 12, 26 come into contact with each other. The biasing means 40 and 38 bias the sealing surfaces 22, 32 toward one another and create a pressure energized metal to metal seal. The housings 64, 98 for the respective sealing elements do not come into contact with one another when the coupler is made up, there is a gap between the first end 68 of the housing 64 and the first end 102 of housing 98 as shown in FIG.

Preferably, the male sealing element 12 includes a first section 42 and a second section 44, as described above, where the first section 42 is coaxially aligned with the second section 44. The female sealing element 24 further comprises a valve seat positioned in the fluid passageway 36 adjacent to the sealing surface and a valve element as described previously.

In a preferred embodiment, the outer surface of the housing has a first portion 146 having a first outer diameter; a second portion 148 having a second outer diameter and a third portion 150 having a third outer diameter. The first outer diameter is larger than the second outer diameter and the second outer diameter is larger than the third outer diameter. The third portion 150 can have threads 144 for threading into a mandrel or other body. (See FIG. 4) The diameters are dictated by the requirements for a specific situation and can change depending on the mandrel or connector to be fitted with the coupling elements.

While certain preferred embodiments of the invention have been described herein, the invention is not to be construed as so limited, except to the extent that such limitations are found in the claims.

I claim:

1. A coupling element comprising:

a male sealing element having a first end, a second end, and a longitudinal axis extending between the first end and the second end, said male sealing element having a generally cylindrical shape, wherein said first end defines a generally frustro-conical sealing surface, said male sealing element defines a fluid passageway therethrough for the transmission of fluids; and said generally frusto-conical sealing surface forms a metal to metal seal when mated with a female sealing element, and further, wherein the male sealing element further comprises a first section and a second section, wherein the first section is coaxially aligned with the second section, wherein the first section has a first end, a second end, and an outer surface defining an outer diameter, and the second section has a first end, a second end, and an outer surface defining an outer diameter, wherein the first end of the first section includes the generally frusto-conical sealing surface and the second end of the first section is in sealing contact with the first end of the second section, wherein the outer diameter of the first section is smaller than the outer diameter of the second section.

2. The coupling element of claim 1, wherein the outer surface of the second section defines a pair of radially extending grooves positioned between the first end and the second end of the second section, said coupling element further comprising a pair of elastomeric sealing elements received in said pair of radially extending grooves, wherein said pair of elastomeric sealing elements contact the bore formed by the housing.

3. A coupling element comprising:
a male sealing element having a first end, a second end, and a longitudinal axis extending between the first end and the second end, said male sealing element having a generally cylindrical shape,
wherein said first end defines a generally frustro-conical sealing surface,
said male sealing element defines a fluid passageway therethrough for the transmission of fluids; and
said generally frustro-conical sealing surface forms a metal to metal seal when mated with a female sealing element, and further, comprising a housing for receiving the male sealing element, wherein said first end of said male sealing element extends from said housing, and a means for biasing the male sealing element along the longitudinal axis from a first position to a second position, said means for biasing being positioned between the second end of the male sealing element and the housing, so that the male sealing element is capable of axial movement with respect to the longitudinal axis to compensate for axial misalignment of the male sealing element, wherein a portion of said male sealing element is capable of lateral movement with respect to said longitudinal axis to compensate for lateral misalignment of the male sealing element.

4. The coupling element of claim 2, wherein said housing has a longitudinal axis that is coaxially aligned with the longitudinal axis of the male sealing element, a first end and a second end, said housing being formed from a sidewall defining a bore positioned along said longitudinal axis and extending therethrough, said bore defining and inside surface having an inside diameter, wherein the outer diameter of the first section of the male sealing element is smaller than the inside diameter of the adapter, and the outer surface of the second section is closely received by the inside surface of the housing.

5. The coupling element of claim 4, wherein the first end of the second section defines a substantially flat face, said substantially flat face defining an annularly extending groove for receiving a face seal for sealably engaging the second end of the first section, wherein said coupling element further comprises a face seal received in the annularly extending groove and contacts the second end of the first section.

6. The coupling element of claim 4, wherein the inside surface of the bore defines an annular wall portion facing the first end of the male sealing element, said biasing means being positioned between the second end of the male sealing element and the annular wall portion.

7. The coupling element of claim 4, wherein the second end of the second section is biased toward the first section by the biasing means.

8. The coupling element of claim 7, wherein said biasing means comprises a flat compression spring means.

9. The coupling element of claim 3, further comprising a retainer means mounted on the inside surface of the housing near the first end, for releasably engaging the male sealing element inside the housing.

10. A coupling element comprising:
a male sealing element having a first end, a second end, and a longitudinal axis extending between the first end and the second end, said male sealing element having a generally cylindrical shape,
wherein said first end defines a generally frustro-conical sealing surface,
said male sealing element defines a fluid passageway therethrough for the transmission of fluids;
said generally frustro-conical sealing surface forms a metal-to-metal seal when mated with a female sealing element,
wherein said generally frustro-conical sealing surface defines a radially extending groove, said male sealing means further comprising a radially extending elastomeric seal means received in said radially extending groove; and wherein a housing having an outer surface defining a pair of radially extending grooves near the second end, said housing further comprising a pair of elastomeric sealing means received in the pair of radially extending grooves.

11. A coupling element comprising:
a female sealing element having a first end, a second end, and a longitudinal axis extending between the first end and the second end, said first end defines a sealing surface, said sealing surface forming a metal-to-metal seal when mated with a male sealing element, said female sealing element having a generally cylindrical shape; and
said female sealing element defines a fluid passageway therethrough for the transmission of fluids and, further comprising a housing for receiving said female sealing element, wherein the first end of the female sealing element extends from said housing; and a means for biasing the female sealing element from a first position to a second position, said means for biasing being positioned between the female sealing element and the housing adjacent to the second end of the female sealing element, wherein said female sealing element is capable of axial movement with respect to the longitudinal axis to accommodate for axial misalignment of the female sealing element.

12. The coupling element of claim 11, wherein said housing has a longitudinal axis that is coaxially aligned with the longitudinal axis of the female sealing element, a first end and a second end, said second housing being formed from a sidewall defining a bore positioned along said longitudinal axis and extending therethrough, said bore defining and inside surface having an inside diameter.

13. The coupling element of claim 11, wherein the female sealing element has an outer surface defining a pair of radially extending grooves, said female sealing element further comprising two radially extending elastomeric sealing elements received in said pair of radially extending grooves.

14. The coupling element of claim 12, wherein said biasing means comprises a flat compression spring means.

15. The coupling element of claim 12, further comprising a retainer means mounted on the inside surface of the housing near the first end, for releasably engaging the female sealing element inside the housing. positioned in the fluid passageway adjacent to the sealing surfac 16. The coupling element of claim 15, further comprising a valve seat positioned in the fluid passageway adjacent to the sealing surface, said valve seat facing away from the sealing surface;
- said female sealing element further comprises a valve element positioned in a generally longitudinally extending portion of the passage adjacent to the sealing surface, said valve element having a valve face to sealingly contact the valve seat; and
- means for biasing the valve element toward the valve seat.

17. A coupling element comprising:
- a female sealing element having a first end, a second end, and a longitudinal axis extending between the first end and the second end, said first end defines a sealing surface, said sealing surface forming a metal-to-metal seal when mated with a male sealing element, said female sealing element having a generally cylindrical shape; and
- said female sealing element defines a fluid passageway therethrough for the transmission of fluids,
- wherein said first end of the female sealing element defines a generally frustro-conical surface which defines an axially extending tapered recess therein, said recess converging toward the second end of the female sealing element,
- a housing having a longitudinal axis that is coaxially aligned with the longitudinal axis of the female sealing element, a first end and a second end, said second housing being formed from a sidewall defining a bore positioned along said longitudinal axis and extending therethrough, and wherein said bore has an inside surface defining an annular wall portion facing the first end of the female sealing element, biasing means being positioned between the second end of the female sealing element and the annular wall portion.

18. The coupling element of claim 17, wherein the housing has an outer surface defining a pair of grooves, said coupling element further comprising a pair of elasomeric sealing means received in said pair of grooves.

19. A coupler assembly comprising:
- a male sealing element and a female sealing element;
- wherein said male sealing element has a first end, a second end, and a longitudinal axis extending between the first end and the second end, said male sealing element having a generally cylindrical shape,
- wherein said first end defines a generally frusto-conical sealing surface,
- wherein a portion of said male sealing element is capable of lateral movement with respect to said longitudinal axis to compensate for lateral misalignment of the male sealing element;
- said male sealing element defines a fluid passageway therethrough for the transmission of fluids;
- said generally frusto-conical sealing surface forms a metal-to-metal seal when mated with said female sealing element;
- a first housing for receiving said male sealing element, said first end of said male sealing element extending therefrom;
- wherein said female sealing element has a first end, a second end, and a longitudinal axis extending between the first end and the second end, said first end defining a sealing surface, said sealing surface forms a metal-to-metal seal when mated with said male sealing element, said female sealing element having a generally cylindrical shape;
- wherein said female sealing element is capable of axial movement with respect to the longitudinal axis from a first position to a second position to accommodate for axial misalignment of the female sealing element;
- said female sealing element defines a fluid passageway therethrough for the transmission of fluids, said fluid passageway being coaxially aligned with the fluid passageway defined by the male coupling element;
- a second housing for receiving said female sealing element, said first end of said female sealing element extending therefrom; and
- said male sealing element contacts said female sealing element to form a pressure energized metal-to-metal seal.

20. The coupler assembly of claim 19, further comprising a means for biasing the male sealing element along the longitudinal axis from a first position to a second position, said means for biasing being positioned between the second end of the male sealing element and the first housing, so that the male sealing element is capable of axial movement with respect to the longitudinal axis to compensate for axial misalignment of the male sealing element; and a means for biasing the female sealing element toward the male sealing element, said means for biasing being positioned between the second end of the female sealing element and the second housing.

21. The coupler assembly of claim 19, wherein the male sealing element includes a first section and a second section, wherein the first section is coaxially aligned with the second section wherein the first section has a first end, a second end, and an outer surface defining an outer diameter, and the second section has a first end, a second end, and an outer surface defining an outer diameter, wherein the first end of the first section includes the generally frusto-conical sealing surface and the second end of the first section is in sealing contact with the first end of the second section, wherein the outer diameter of the first section is smaller than the outer diameter of the second section.

22. The coupler assembly of claim 19, wherein said female sealing element further comprises a valve seat positioned in the fluid passageway adjacent to the sealing surface, said valve seat facing away from the sealing surface;
- said female sealing element further comprising a valve element positioned in a generally longitudinally extending portion of the passage adjacent to the sealing surface, said valve element having a valve face to sealingly contact the valve seat; and
- means for biasing the valve element toward the valve seat.

23. A coupling element comprising:
- a female sealing element having a first end, a second end, and a longitudinal axis extending between the first end and the second end, said first end defining a sealing surface, said sealing surface forming a metal-to-metal seal when mated with a male sealing element, said female sealing element having a generally cylindrical shape;
- said female sealing element defining a fluid passageway therethrough for the transmission of fluids, and
- a valve seat positioned in the fluid passageway adjacent to the sealing surface, said valve seat facing away from the sealing surface,
- said female sealing element further comprising a valve element positioned in a generally longitudinally extending portion of the passage adjacent to the sealing surface, said valve element having a valve face to sealingly contact the valve seat, a housing for receiving said female sealing element, wherein said housing has a longitudinal axis that is coaxially aligned with the longitudinal axis of the female sealing element, a first end and a second end, said housing being formed from a sidewall defining a bore positioned along said longitudinal axis and extending therethrough, said bore defining an inside surface having an inside diameter and further wherein the first end of the female sealing element extends from said housing;

a means for biasing the female sealing element from a first position to a second position, said means for biasing being positioned between the female sealing element and the housing adjacent to the second end of the female sealing element, wherein said female sealing element is capable of axial movement with respect to the longitudinal axis from a first position to a second position to accommodate for axial misalignment of the female sealing element, and wherein the valve element is in sealing contact with the valve seat when the female sealing element is in the first position and further wherein the inside surface of the bore defines an annular wall portion facing the first end of the female sealing element, said biasing means being positioned between the second end of the female sealing element and the annular wall portion.

24. A coupling element comprising:

a female sealing element having a first end, a second end, and a longitudinal axis extending between the first end and the second end, said first end defining a sealing surface, said sealing surface forming a metal-to-metal seal when mated with a male sealing element, said female sealing element having a generally cylindrical shape;

said female sealing element defining a fluid passageway therethrough for the transmission of fluids, and a valve seat positioned in the fluid passageway adjacent to the sealing surface, said valve seat facing away from the sealing surface, said female sealing element further comprising a valve element positioned in a generally longitundinally extending portion of the passage adjacent to the sealing surface, said valve element having a valve face to sealingly contact the valve seat, a housing for receiving said female sealing element, wherein the first end of the female sealing element extends from said housing;

a means for biasing the female sealing element from a first position to a second position, said means for biasing being positioned between the female sealing element and the housing adjacent to the second end of the female sealing element, wherein said female sealing element is capable of axial movement with respect to the longitudinal axis from a first position to a second position to accommodate for axial misalignment of the female sealing element, and wherein the valve element is in sealing contact with the valve seat when the female sealing element is in the first position and further, comprising a retainer means mounted on the inside surface of the housing near the first end, for releasably engaging the female sealing element inside the housing.

25. The coupling element of claim 24, wherein the outer surface of the housing has a first portion having a first outer diameter; a second portion having a second outer diameter and a third portion having a third outer diameter, wherein said first outer diameter is larger than said second outer diameter and said second outer diameter is larger than said third outer diameter.

* * * * *